US011509661B2

(12) United States Patent
Gambhir et al.

(10) Patent No.: US 11,509,661 B2
(45) Date of Patent: Nov. 22, 2022

(54) DYNAMIC AUTHORIZATION RULE STACKING AND ROUTING ACROSS MULTIPLE SYSTEMS

(71) Applicant: Disney Enterprises, Inc., Burbank, CA (US)

(72) Inventors: Pankaj Gambhir, Ho-Ho-Kus, NJ (US); Joseph Inzerillo, Brooklyn, NY (US); Rajendra Dubagunta, Edison, NJ (US); Adetayo Adeleye, Jersey City, NJ (US); Mahesh Swaminathan, Elmsford, NY (US); Fekade Sergew, Brooklyn, NY (US); Kazuhiro Kusunoki, Jackson Heights, NY (US); Sean Curtis, Rockville Centre, NY (US)

(73) Assignee: Disney Enterprises, Inc., Burbank, CA (US)

(*) Notice: Subject to any disclaimer, the term of this patent is extended or adjusted under 35 U.S.C. 154(b) by 163 days.

(21) Appl. No.: 17/084,533

(22) Filed: Oct. 29, 2020

(65) Prior Publication Data

US 2022/0141228 A1 May 5, 2022

(51) Int. Cl.
| | |
|---|---|
| G06F 15/16 | (2006.01) |
| H04L 9/40 | (2022.01) |
| G06F 16/901 | (2019.01) |
| G06Q 20/12 | (2012.01) |
| H04L 67/306 | (2022.01) |
| H04L 65/60 | (2022.01) |
| G06Q 30/06 | (2012.01) |

(Continued)

(52) U.S. Cl.
CPC ........ *H04L 63/102* (2013.01); *G06F 16/9024* (2019.01); *G06Q 20/127* (2013.01); *G06Q 30/0207* (2013.01); *G06Q 30/0283* (2013.01); *G06Q 30/0611* (2013.01); *H04L 63/20* (2013.01); *H04L 65/60* (2013.01); *H04L 67/306* (2013.01); *H04L 2101/37* (2022.05)

(58) Field of Classification Search
None
See application file for complete search history.

(56) References Cited

U.S. PATENT DOCUMENTS

2002/0078050 A1* 6/2002 Gilmour ............. G06F 21/6218
707/999.009

* cited by examiner

*Primary Examiner* — Wing F Chan
*Assistant Examiner* — Andrew Woo
(74) *Attorney, Agent, or Firm* — Farjami & Farjami LLP

(57) ABSTRACT

A system includes a hardware processor that executes a software code to receive an authorization request on behalf of a user for a stacked resource including resources offered separately by multiple resource providers, determine resource provider computers associated with the stacked resource, and send a look-up request including an electronic identity of the user to those computers, where the electronic identity is used as a look-up key for determining user attribute(s) of the user. The software code further receives the user attribute(s) from the resource provider computers, generates an accumulated access profile of the user based on the user attribute(s), applies the profile to a rules engine to determine a stacked access result, and routes the authorization request and the stacked access result to one of the resource provider computers, where that computer completes an authorization process for access to the stacked resource based on the stacked access result.

20 Claims, 5 Drawing Sheets

(51) Int. Cl.
*G06Q 30/02* (2012.01)
*H04L 101/37* (2022.01)

DYNAMIC AUTHORIZATION RULE STACKING AND ROUTING ACROSS MULTIPLE SYSTEMS

BACKGROUND

Large sized enterprises may have multiple avenues, internal and external, to authorize access to a variety of resources to users over a network. One example is in the case of online purchasing of separate online services that can be purchased both individually or together as a "bundle." In doing so, users might end up with products and services that are essentially related and that "stack" upon one another. An example of a "stack" may include subscription services in which a bundle subscription overlaps an existing individual subscription that has already been authorized to the user. In that scenario, it's important to have an engine that appropriately accommodates stacked authorization rules (e.g., discounting rules) in a dynamic manner and that may route the user to the point-of-sale system that results in the most efficient authorization process.

DETAILED DESCRIPTION

Figure 1:
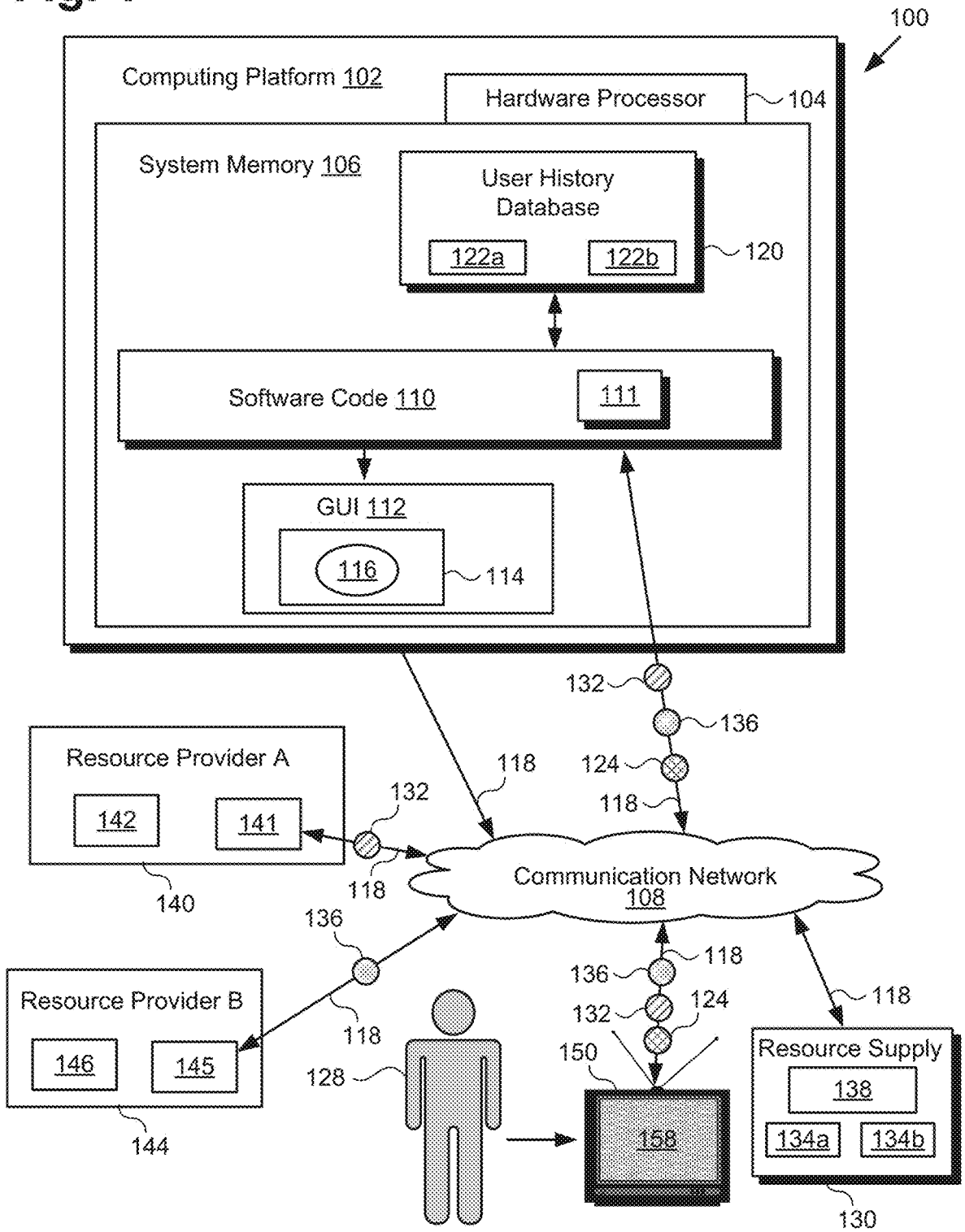
FIG. 1 shows an exemplary system for performing dynamic authorization rule stacking and routing across multiple systems, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions. The present application discloses systems and methods for performing dynamic authorization rule stacking and routing across multiple systems that address and overcome the deficiencies in the conventional art. It is noted that the novel and inventive authorization rule stacking and routing solution disclosed by the present application can be applied to any set of authorization rules that overlap, such that having already met one condition also means that one or more other conditions have been at least partially met and only need to satisfy the other parts of the outstanding condition to gain authorized access. For example, a main condition for authorization to access a resource might be "user needs to meet condition X, Y, and Z within time less than n+1" and information obtained about the user reveals that the user has already satisfied a condition of "user needs to meet condition X and Y within time less than n." Consequently, the user now only need to satisfy the condition "meet condition Z within time less than n+1" because satisfying the other conditions partially satisfies the main condition. That is to say, the present concepts may be broadly applied to use of a computer to authorize access to substantially any resource.

According to some implementations, in response to receiving, over a network, an authorization request for a stacked resource on behalf of a user, the stacked resource including multiple resources each offered separately by one of multiple resource providers, the present dynamic authorization and routing solution includes determining resource provider computers associated with the stacked resource. It should be noted that one entity or company may include or act as more than one resource provider. The present solution further includes sending a look-up request including an electronic identity of the user to the resource provider computers, where the electronic identity is used as a common look-up key by each of the resource provider computers for determining one or more user attributes of the user, and receiving, from the plurality of resource provider computers in response to the look-up request, the one or more user attributes. The present solution continues with generating an accumulated access profile of the user based on the one or more user attributes, applying the accumulated access profile to a rules engine to determine a stacked access result, and routing the authorization request and the stacked access result to one of the resource provider computers, wherein the resource provider computer completes an authorization process for authorizing access to the stacked resource based on the stacked access result.

As a specific but non-limiting example of the foregoing system and method description, the authorization request may be a purchase request on behalf of the user for the stacked resource. In that exemplary use case, the user attributes may take the form of entitlements to resources included in the stacked resource already held by the user. Moreover, when an entitlement to one or more of the stacked resources is held by the user, the present solution determines the cost to the user of that or those entitlements, and determines a discount to be applied to a predetermined price for the stacked resource using the entitlement cost or costs. The discount may then be applied to the predetermined price to dynamically generate the stacked access result in the form of a discount price for the stacked resource that is specific to the user's entitlement holdings. The present solution further includes routing the purchase request and the discount price to one of the resource provider computers, wherein the resource provider computer completes an authorization process for authorizing access to the stacked resource based on the discount price.

It is noted that, as used in the present application, the expression "stacked resource" may refer to a combination of resources that can be accessed according to multiple authorization rules applied by multiple systems. One example of a stacked resource is a "stacked subscription" that involves a combination of subscriptions that can each be purchased in a variety of ways. A "bundle" of resources may refer to two or more resources being offered together at a price less than the cumulative price of the resources when purchased separately. Therefore, a request to purchase a "bundle" is a request to purchase a "stacked resource" because the bundle itself has its own set of authorization rules (e.g. price or discount applied based on a set of conditions) while the individual subscriptions have their own set of authorization rules set by the individual resource providers, which the requesting user may have already met (e.g. an individual subscription cost X per year, user already paid Y dollars on Z date). However, the authorization rules can include other rules or conditions besides those relating to price, and the present novel and inventive concepts disclose combining/stacking those conditions together when authorizing access to the combination of resources in the stack concurrently.

Moreover, as used in the present application, the term "resource" may refer to a service, digital content, a financial instrument, any article of commerce, such as a commodity or article of manufacture, or a secure building, terminal, network, or file requiring a combination of validation actions for access. A service may take the form of a subscription service, such as any of a variety of commercially available software as a service (SaaS) subscriptions, or a subscription to a content streaming service. Examples of digital content may include software, movies, series or episodes of television (TV) programming, music, video games, or digital books, to name a few. Financial instruments may include stocks, bonds, mutual fund shares, futures, precious metals, or cryptocurrency, for example. Thus, a stacked resource may include two or more of any of the resources described above, or to any combination of those resources.

In some implementations, the systems and methods disclosed by the present application may be substantially or fully automated. It is noted that, as used in the present application, the terms "automation," "automated", and "automating" refer to systems and processes that do not require the participation of a human system operator. Although, in some implementations, a human system administrator may review a stacked access result determined by the automated systems and according to the automated methods described herein, that human involvement is optional. Thus, the methods described in the present application may be performed under the control of hardware processing components of the disclosed automated systems.

FIG. 1 shows an exemplary system for performing dynamic authorization rule stacking and routing across multiple systems, according to one implementation. As shown in FIG. 1, system 100 includes computing platform 102 having hardware processor 104 and system memory 106 implemented as a non-transitory storage device. According to the present exemplary implementation, system memory 106 stores software code 110 including rules engine 111 and providing graphical user interface (GUI) 112, and user history database 120. Also shown in FIG. 1 is window 114 of GUI 112 presenting user stacked access result 116 for stacked resource 138 to user 128.

As further shown in FIG. 1, system 100 is implemented within a use environment including communication network 108, user system 150 including display 158, and user 128 utilizing user system 150 to interact with system 100. In addition, FIG. 1 shows resource provider A 140 having computer 141 and providing resource 142, resource provider B 144 having computer 145 and providing resource 146, resource supply 130 accessible to system 100 and including resources 134a and 134b as well as stacked resource 138, authorization request 124, and user attributes 132 and 136. Also shown in FIG. 1 are user histories 122a and 122b stored in user history database 120, and network communication links 118 of communication network 108 interactively connecting system 100 with computer 141 of resource provider A 140, computer 145 of resource provider B 144, resource supply 130, and user system 150. It is noted that although in some implementations resource supply 130 may merely be accessible to system 100 via communication network 108 and network communication links 118, in other implementations, resource supply 130 may be included as part of system 100.

It is further noted that although only two resource providers external to system 100 are shown in FIG. 1 in the interests of conceptual clarity, in other implementations, resource provider A 140 and resource provider B 144 may correspond to many more than two external resource providers, such as hundreds, or thousands of external resource providers, for example. In addition, although FIG. 1 depicts one resource available from each of resource provider A 140 and resource provider B 144, once again that representation is provided merely in the interests of conceptual clarity. More generally, each of resource provider A 140 and resource provider B 144 may have hundreds, thousands, or tens of thousands of resources available for acquisition through purchase, rental, or subscription for example.

It is also noted that user history 122a in user history database 120 is a user history of user 128 and may identify one or more user attributes of user 128, such as resource entitlements held by user 128, while user history 122b may be an analogous user history for a different user, i.e., an individual user other than user 128. As defined for the purposes of the present application, the feature "resource entitlement" or simply "entitlement" refers to a permanent or temporary right to use or possess a resource. For example, an entitlement may take the form of an ownership, rental, subscription, or lease right to access and use of a particular resource.

Although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102 or to a hardware processor of user system 150. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts software code 110 and user history database 120 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network.

Although user system 150 is shown as a smart TV in FIG. 1, that representation is also provided merely as an example. More generally, user system 150 may be any suitable mobile or stationary computing device or system that implements data processing capabilities sufficient to enable use of GUI 112, support connections to communication network 108, and implement the functionality ascribed to user system 150 herein. For example, in other implementations, user system 150 may take the form of a desktop or laptop computer, a tablet computer, a smartphone, an e-reader or a game console, for example. Alternatively, in some implementations, user system 150 may take the form of a wearable personal communication device, such as an augmented reality (AR) or virtual reality (VR) headset or glasses, a smartwatch, or another smart personal item worn or carried by user 128.

User 128, who may be a user of a subscription service that streams or otherwise delivers media content such as movies, TV programming content or other episodic media content, music, video games, or digital books, for example, may utilize user system 150 to interact with system 100 via GUI 112 to purchase or otherwise access stacked resource 138. Stacked resource 138 may include two or more resources 134a and 134b available from resource supply 130, resource 142 provided by resource provider A 140, and resource 146 provided by resource provider 144. User 128 may utilize window 114 of GUI 112 to view stacked asset result 116, which may be a user specific discount price for stacked resource 138, for example, determined dynamically for user 128 by software code 110 using rules engine 111, and rendered on display 158 of user system 150.

Display 158 of user system 150 may take the form of a liquid crystal display (LCD), a light-emitting diode (LED) display, an organic light-emitting diode (OLED) display, a quantum dot (QD) display, or any other suitable display screen that performs a physical transformation of signals to light. It is noted that, in some implementations, display 158 may be integrated with user system 150, such as when user system 150 takes the form of a laptop or tablet computer for example. However, in other implementations, for example where user system 150 takes the form of a computer tower in combination with a desktop monitor, display 158 may be communicatively coupled to, but not physically integrated with user system 150.

In some implementations, as noted above, stacked asset result 116 may be a user specific discount price for stacked resource 138. In those implementations, hardware processor 104 of system 100 may execute software code 110 to determine the user specific discount price for purchase of stacked resource 138 by user 128 dynamically, based on a predetermined price for stacked resource 138 and any entitlements to resources included in stacked resource 138 that are already held by user 128. The user specific discount price may be determined by determining the cost to user 128 for any entitlements to resources included in stacked resource 138 that are held by user 128, and reducing the predetermined price for stacked resource 138 using that cost. In some implementations, the user specific discount price for purchase of stacked resource 138 may be presented to user 128 via GUI 112 accessible to user system 150 via communication network 108 and network communication links 118. For example, user system 150 may have stored thereon a software application providing a GUI corresponding to GUI 112 and enabling user 128 to interact with system 100.

In some implementations software code 110 may employ a directed acyclic graph (DAG), as known in the art. For example, applying an accumulated access profile to rules engine 111 may include traversing the DAG, where each node in the DAG includes a preconfigured authorization rule. Software code 110 may execute the DAG using recursion from a start node until reaching a termination node. At each node of the DAG traversal, the condition defined at the node is evaluated. Based on the condition evaluation result, a transition rule defined in the node determines the next node, a discount, and the reason for the discount. If the transition rule does not provide the next node, the present node is the terminal node and the total discount is determined from the graph traversal. In one implementation, each node evaluation result can be accumulated using a Routing Slip technique, as also known in the art.

In one implementation system 100 may include computing platform 102 having hardware processor 104, system memory 106, software code 110 stored in system memory 106. In such an implementation, hardware processor 104 may be configured to execute software code 110 to receive, over network 108, authorization request 124 for a stacked resource on behalf of user 128, the stacked resource including a plurality of resources each offered separately by one of a plurality of resource providers, authorization request 124 comprising an electronic identity of user 128. Hardware processor 104 may be configured to execute software code 110 to obtain, using the electronic identity of user 128, one or more user attributes of user 128 utilized by the plurality of resource providers to identity user 128, generate an accumulated access profile of the user based on the one or more user attributes, and apply the accumulated access profile to a rules engine to determine a stacked access result. Hardware processor 104 may further be configured to execute software code 110 to route authorization request 124 and the stacked access result to a computer of one of the plurality of resource providers, wherein the computer of the one of the resource providers completes an authorization process for authorizing access to the stacked resource based on the stacked access result.

Figure 2:
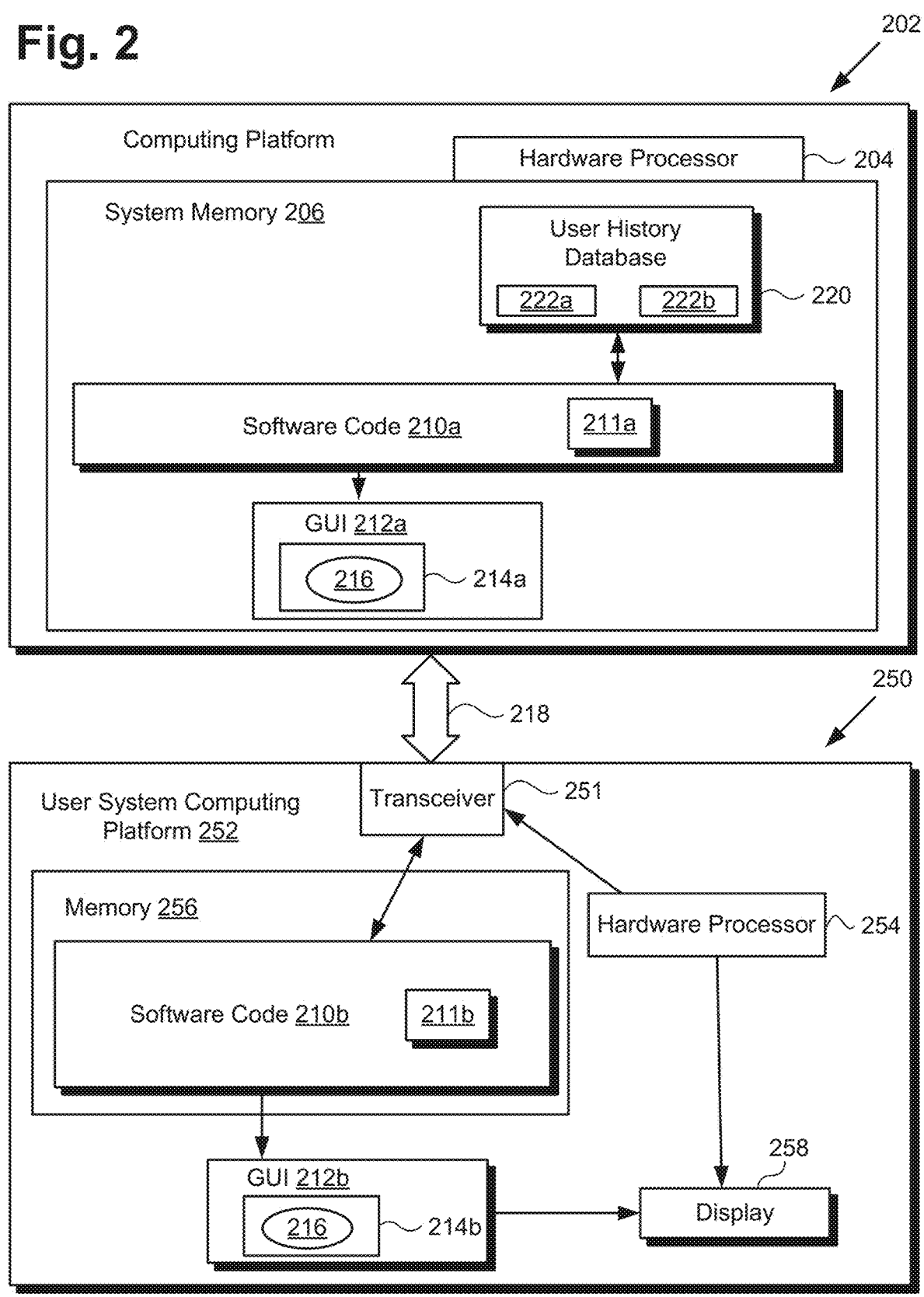
FIG. 2 shows a more detailed exemplary representation of a user system suitable for use in performing dynamic authorization rule stacking and routing across multiple systems, in combination with a computer server.

FIG. 2 shows a more detailed representation of exemplary user system 250 in combination with computing platform 202 implemented as a computer server. As shown in FIG. 2, user system 250 is communicatively coupled to computing platform 202 over network communication link 218. Computing platform 202 includes hardware processor 204, and system memory 206 storing user history database 220 including user histories 222a and 222b, as well as software code 210a including rules engine 211a and providing GUI 212a. In addition, FIG. 2 shows window 214a of GUI 212a including stacked asset result 216.

As further shown in FIG. 2, user system 250 includes user system computing platform 252 having hardware processor 254, memory 256 implemented as a non-transitory storage device storing software code 210b including rules engine 211b, and GUI 212b provided by software code 210b. As also shown in FIG. 2, user system 250 includes transceiver 251, and display 258 for rendering GUI 212b including window 214b showing stacked asset result 216 for stacked resource 138, in FIG. 1.

Network communication link 218 and computing platform 202 having hardware processor 204 and system memory 206 correspond respectively in general to network communication links 118 and computing platform 102 having hardware processor 104 and system memory 106, in FIG. 1. In addition, software code 210a, rules engine 211a, and GUI 212a, in FIG. 2, correspond respectively in general to software code 110, rules engine 111, and GUI 112, in FIG. 1. In other words, software code 210*a*, rules engine 211*a*, and GUI 212*a*, may share any of the characteristics attributed to respective software code 110, rules engine 111, and GUI 112 by the present disclosure, and vice versa. It is also noted that stacked asset result 216 and user history database 220 including user histories 222*a* and 222*b*, in FIG. 2, correspond respectively in general to stacked asset result 116 and user history database 120 including user histories 122*a* and 122*b*, in FIG. 1.

User system 250 and display 258 correspond in general to user system 150 and display 158, in FIG. 1, and those corresponding features may share any of the characteristics attributed to either corresponding feature by the present disclosure. Thus, like user system 150, user system 250 may take the form of a smart TV, desktop computer, laptop computer, tablet computer, smartphone, e-reader, game console, or a wearable personal communication device, for example. In addition, and although not shown in FIG. 1, user system 150 may include features corresponding to hardware processor 254, transceiver 251, memory 256 storing software code 210*b* including rules engine 211*b*, and GUI 212*b* provided by software code 210*b*. Moreover, like display 158, display 258 may be implemented as an LCD, an LED display, an OLED display, a QD display, or any other suitable display screen that performs a physical transformation of signals to light.

Transceiver 251 may be implemented as a wireless communication unit enabling user system 250 to exchange data with computing platform 202 via network communication link 218. For example, transceiver 251 may be implemented as a fourth generation (4G) wireless transceiver, or as a 5G wireless transceiver configured to satisfy the IMT-2020 requirements established by the International Telecommunication Union (ITU). Alternatively, or in addition, transceiver 251 may be configured to communicate via one or more of WiFi, Bluetooth, ZigBee, and 60 GHz wireless communications methods.

With respect to software code 210*b*, it is noted that in some implementations, software code 210*b* may be a thin direct-to-consumer application merely providing GUI 212*b* for presenting stacked asset result 216 to user 128, in FIG. 1. However, in other implementations, software code 210*b* may be a direct-to-user application including all of the features of software code 210*a*, and may be capable of executing all of the same functionality. That is to say, in some implementations, software code 210*b* including rules engine 211*b* corresponds to software code 110 including rules engine 111 in FIG. 1, and may share any of the characteristics attributed to that corresponding feature by the present disclosure. Furthermore, it is noted that window 214*b* corresponds in general to window 214*a* and may share any of the characteristics attributed to that corresponding feature by the present disclosure.

According to the exemplary implementation shown in FIG. 2, software code 210*b* is located in memory 256, having been received via network communication link 218, either from computing platform 202 or an authorized third party source of software code 210*b*. In one implementation, network communication link 218 corresponds to transfer of software code 210*b* over a packet-switched network, such as the Internet, for example.

Once transferred, for instance by being downloaded over network communication link 218, software code 210*b* may be persistently stored in memory 256, and software code 210*b* may be executed on user system 250 by hardware processor 254. Hardware processor 254 may be the central processing unit (CPU) for user system 250, for example, in which role hardware processor 254 runs the operating system for user system 250 and executes software code 210*b*. Thus, in some implementations, the computing platform for performing dynamic authorization rule stacking and routing across multiple systems may be user system computing platform 252.

Figure 3:
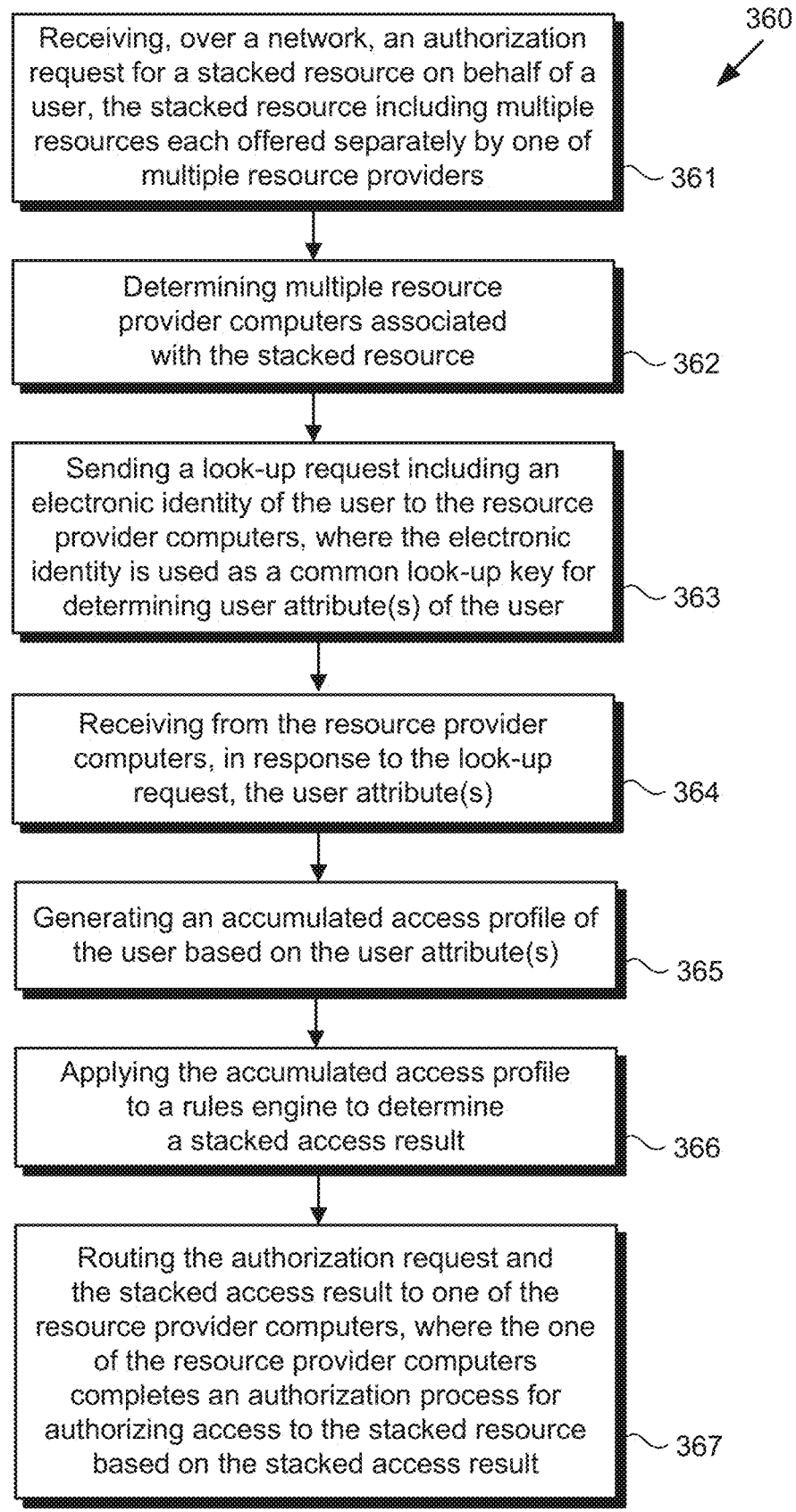
FIG. 3 shows a flowchart presenting an exemplary method for performing dynamic authorization rule stacking and routing across multiple systems, according to one implementation.

The functionality of software code 110/210*a*/210*b* in FIGS. 1 and 2 will be further described by reference to FIG. 3. FIG. 3 shows flowchart 360 presenting an exemplary method for use by a system, such as system 100, or user system 150/250, for performing dynamic authorization rule stacking and routing across multiple systems. With respect to the method outlined in FIG. 3, it is noted that certain details and features have been left out of flowchart 360 in order not to obscure the discussion of the inventive aspects disclosed in the present application.

Referring to FIG. 3 in combination with FIG. 1, flowchart 360 begins with receiving authorization request 124 for stacked resource 138 on behalf of user 128, where stacked resource 138 includes two or more resources each offered separately by one of multiple resource providers (action 361). It is noted that authorization request 124 includes an electronic identity of user 128, which may be an email address user 128, for example. It is further noted that in the interests of conceptual clarity, the method outlined by flowchart 360 will be described by reference to a merely exemplary use case in which stacked resource 138 includes resource 142 offered separately by resource provider A 140, resource 146 offered separately by resource provider B 144, and resource 134*a* separately available to user 128 from resource supply 130 through system 100.

As noted above, each of resources 134*a*, 142, and 146 included in stacked resource 138 may take the form of a service, digital content, a financial instrument, or to any article of commerce, such as a commodity or article of manufacture. For example, one or more of resources 134*a*, 142, and 146 may be a subscription service, such as SaaS or a content streaming service, for example. Alternatively, or in addition, one or more of resources 134*a*, 142, and 146 may include movies, series or episodes of TV programming, music, video games, digital books, stocks, bonds, mutual fund shares, futures, precious metals, or cryptocurrency, for example.

As shown by FIG. 1, in one implementation, authorization request 124 may be received from user system 150 by system 100 via communication network 108 and network communication links 118. In those implementations, authorization request 124 may be received by software code 110, executed by hardware processor 104 of computing platform 102. However, referring to FIG. 2 in combination with FIG. 1, in another implementation, authorization request 124 may be received by software code 210*b*, executed by hardware processor 254 of user system 150/250, as a result of one or more inputs to user system 150/250 by user 128, such as manual inputs or voice inputs, for example.

Continuing to refer to FIGS. 1, 2, and 3, flowchart 360 continues with determining resource provider computers 102, 141, and 145 associated with stacked resource 138 (action 362). Resource provider computers 102, 141, and 145 may be determined based on the resources included in stacked resource 138. For example, computing platform 102 of system 100 may be determined to be a resource provider computer in action 362 due to the inclusion of resource 134*a* in stacked resource 138. Resource provider computer 141 may be a web server of resource provider 140, and may be determined in action 362 based on inclusion of resource 142 provided by resource provider 140 in stacked resource 138. Analogously, resource provider computer 145 may be a web server of resource provider 144, and may be determined in action 362 based on inclusion of resource 146 provided by resource provider 144 in stacked resource 138.

As shown by FIG. 1, in one implementation, determination of resource provider computers 141 and 145 may be performed by system 100 via communication network 108 and network communication links 118. In those implementations, determination of resource provider computers 102, 141, and 145 may be performed by software code 110, executed by hardware processor 104 of computing platform 102. However, referring to FIG. 2 in combination with FIG. 1, in another implementation, determination of resource provider computers 102, 141, and 145 may be performed by user system 150/250 using transceiver 251. In those implementations, determination of resource provider computers 102, 141, and 145 may be performed by software code 210b, executed by hardware processor 254 of user system computing platform 252.

Flowchart 360 continues with sending a look-up request including the electronic identity of user 128 to resource provider computers 141 and 145, or to resource provider computers 102, 141, and 145, where the electronic identity is used as a common look-up key by each of the resource provider computers for determining one or more user attributes of user 128 (action 363). Referring to FIG. 1, in implementations in which action 363 is performed by software code 110, executed by hardware processor 104, action 363 may include sending look-up requests to resource provider computers 141 and 145 via communication network 108 and network communication links 118. In addition, in those implementations, action 363 may include sending another look-up request as an internal system request to user history database 120 to access user history 122a of user 128. Alternatively, referring to FIG. 2, in implementations in which action 363 is performed by software code 210b, executed by hardware processor 254 of user system 250, action 363 may include sending look-up requests to each of computing platform 102 and resource provider computers 141 and 145 via communication network 108 and network communication links 118.

Flowchart 360 receiving from resource provider computers 141 and 145, or resource provider computers 102, 141, and 145, in response to the look-up request, the one or more user attributes of user 128 (action 364). As noted above, user attributes of user 128 may include entitlements held by user 128, such as a permanent or temporary right to access one or more of resources 134a, 142, and 146 included in stacked resource 138.

Referring to FIG. 1, in implementations in which action 364 is performed by software code 110, executed by hardware processor 104, action 364 may include receiving the one or more user attributes of user 128 from resource provider computers 141 and 145 via communication network 108 and network communication links 118. In addition, in those implementations, action 364 may include receiving the one or more user attributes of user 128 as an internal data transfer from user history database 120. Alternatively, referring to FIG. 2, in implementations in which action 364 is performed by software code 210b, executed by hardware processor 254 of user system 250, action 363 may include action 364 may include receiving the one or more user attributes of user 128 from each of computing platform 102 and resource provider computers 141 and 145 via communication network 108 and network communication links 118.

Flowchart 360 continues with generating an accumulated access profile of user 128 based on the user attributes received in action 364 (action 365). Merely in the interests of conceptual clarity, action 365 is described below by reference to an exemplary implementation in which stacked resource 138 includes resources 134a, 142, and 146 in the form of entitlements to access content. In that implementation, action 365 may include determining the cost to user 128 of any of those entitlements that user 128 already holds. The cost to user 128 of each entitlement held by user 128 may be determined in any of several different ways. By way of example, in use cases in which stacked resource 138 is a bundle of subscriptions to different services that is billed at a monthly subscription stacked price, and user 128 is presently subscribed to one of the stacked services at a monthly subscription rate, the cost to user 128 for the entitlement to that resource may simply be the face value of the monthly subscription presently subscribed to by user 128.

As a specific example of the foregoing, let stacked resource 138 include a subscription to resource 134a provided from resource supply 130, a subscription to resource 142 provided by resource provider A 140, and a subscription to resource 146 provided by resource provider B 142. In addition, let the monthly subscription price for stacked resource 138 be $12.99, the monthly subscription price for resource 134a alone be $5.99, and the monthly subscription price for each of resources 142 and 146 alone be $4.99. In a use case in which user 128 wishes to purchase stacked resource 138 by subscribing to the stacked services for $12.99 per month, but presently has a subscription to resource 142 at a monthly subscription rate of $4.99, the cost to user 128 of the entitlement to resource 142 is the face value of that monthly subscription rate, or $4.99.

By contrast, resource provider A 140 may offer resource 142 at an effectively reduced monthly rate if user 128 pays for multiple months in advance. For example, if user 128 pays $47.88 to resource provider A 140 for a one year subscription to resource 142, the cost to user 128 for the entitlement to resource 142 that is relevant to the monthly subscription to stacked resource 138 is the effectively discounted monthly subscription cost of $3.99 for the entitlement to resource 142, i.e., the annual price of $47.88 divided by twelve months. Thus, in some implementations, action 365 may include identifying a duration of the entitlement held by user 128, and identifying the price paid by user 128 for the entitlement, where the cost to user 128 is determined using the duration of the entitlement and the price paid by user 128 for the entitlement.

Alternatively, or in addition, user 128 may hold an entitlement to resource 146 and may be paying its full monthly subscription rate of $4.99, but may have received an incentive having value from resource provider B 144 in exchange for acquiring the entitlement at face value. For example, if user 128 pays $4.99 per month to resource provider B 144 for a one year subscription to resource 146 but receives a $12.00 credit toward other resources offered by resource provider B 144 as an incentive for the subscription, the cost to user 128 for the entitlement to resource 142 that is relevant to the monthly subscription to stacked resource 138 is the effectively discounted monthly subscription cost of $3.99 for the entitlement to resource 146, i.e., the annual price of the subscription $59.88, less the credit of $12.00, divided by twelve. Thus, in some implementations, action 363 may include identifying the value of an incentive provided to user 128 in exchange for acquisition of the entitlement by user 128, where the cost to user 128 is determined further using the value of the incentive provided to user 128.

Thus, the accumulated access profile of user 128 generated in action 365 may identify which of resources 134*a*, 142, and 146 user 128 holds an entitlement to, as well as the cost to user 128 for each entitlement held by user 128. In one implementation, as shown in FIG. 1, the accumulated access profile of user 128 may be generated in action 365 by software code 110, executed by hardware processor 104 of computing platform 102. However, in other implementations, as shown in FIG. 2, action 365 may be performed by software code 210*b*, executed by hardware processor 254 of user system computing platform 252.

Flowchart 360 continues with applying the accumulated access profile of user 128 to rules engine 111/211*a*/211*b* to determine stacked access result 116/216 (action 366). According to the exemplary implementation described above by reference to action 365, for instance, in which stacked resource 138 includes resources 134*a*, 142, and 146 in the form of entitlements to access content, and in which the accumulated access profile generated in action 365 identifies which of resources 134*a*, 142, and 146 user 128 holds an entitlement to, as well as the cost to user 128 for each entitlement held by user 128, stacked access result 116/216 determined in action 366 may be a discount price for stacked resource 138.

In some implementations, stacked access result 116/216 in the form of a discount price determined in action 366 may be based on the sum of the costs to user 128 determined in action 365. For example, as discussed above, stacked resource 138 may be a stack of services paid monthly at a predetermined stack price of $12.99. Where user 128 has a subscription to each of resources 142 and 146 at its face value monthly subscription rate of $4.99, the discount price determined in action 366 may be based on the sum of those monthly subscription rates, or $9.98. However, where user 128 pays face value of $4.99 per month for each of resources 142 and 146, but receives the $12.00 credit from resource provider B 144 for an annual commitment, the discount price determined in action 366 may be based on a reduced amount of $8.98.

In some implementations, the discount price determined in action 366 may be further based on one or more authorization rules corresponding to the provider of the resource obtained by user 128. Thus, in some implementations, action 366 may include identifying one or more authorization rules corresponding to the resource provider, where the discount price for stacked resource 138 is determined further using the authorization rule or rules corresponding to the resource provider.

In some implementations, user 128 may acquire one or more of resources 142 and 146 from a source other than resource provider A 140 and resource provider B 144. For example, one or more of resources 142 and 146 may be acquired by user 128 from a third party retail source authorized by resource provider A 140 or resource provider B 144 to distribute resources 142 or 146. In those implementations, the discount price determined in action 366 may be based on one or more authorization rules corresponding to the source of the resource. Thus, in some implementations, action 364 may include identifying a source of the resource obtained by user 128, and identifying one or more authorization rules corresponding to the source of the resource, where the discount price for stacked resource 138 is determined further using the authorization rule or rules corresponding to that source.

It is noted that a authorization rule or authorization rules corresponding to a specific source of resources other than resource provider A 140 or resource provider B 144 may differ for the same source depending upon whether the entitlement applies to a resource offered by resource provider A 140 or resource provider B 144. That is to say, a different authorization rule or authorization rules may correspond to hypothetical source "X" of resources depending upon whether the resource obtained by user 128 is provided by resource provider A 140 (i.e., the obtained resource is resource 142) or whether the resource is provided by resource provider B 144 (i.e., the obtained resource is resource 146).

It is further noted that, in some use cases, user 128 may have obtained both of resources 142 and 146, and may be paying their full monthly subscription rate of $4.99 each, but may have received an incentive having value form the source or sources other than resource provider A 140 and resource provider B 144 from which the resource or resources were acquired. In those implementations, determining the discount price for stacked resource 138 in action 366 may include identifying the value of the incentive provided to user 128 in exchange for acquisition of the resource by user 128, where the discount price for stacked resource 138 is determined further using the value of the incentive provided to user 128.

For example, in some implementations in which user 128 has an entitlement to resource 142 alone at its face value monthly subscription rate of $4.99, the discount determined in action 364 may be $4.99, and the discounted price specific to user 128, i.e., user specific discounted price 116/216 may be the predetermined price for stacked resource 138, $12.99, less the discount of $4.99, or $8.00. Alternatively, where user 128 has monthly subscriptions to each of resources 142 and 146 and pays face value of $4.99 per month for each of resources 142 and 146, but receives the $12.00 credit from resource provider B 144 for an annual commitment, user specific discounted price 116/216 may be the predetermined price for stacked resource 138, $12.99, less the discount of $8.98, or $4.01.

In some implementations, applying the accumulated access profile generated in action 365 to rules engine 111/211*a*/211*b* in action 366 includes traversing a DAG, where each node in the DAG includes a preconfigured authorization rule. In one implementation, for example, the preconfigured authorization rule may define a stacked access result, a reason, a condition, and a transition rule. Traversing the DAG in action 366 may include evaluating a first condition defined at a first node to determine a condition evaluation result. Based on the condition evaluation result, traversing the DAG may further include using the transition rule to determine the next node, the stacked access result, and the reason, and evaluating a second condition defined at the next node. Moreover in some implementations, traversing the DAG may also include determining that the transition rule does not determine the next node, terminating the traversal, and outputting the stacked access result, such as displaying the stacked output result 116/216 as a discount price for stacked resource 138 in window 114/214*a*/214*b* of GUI 112/212*a*/212*b*.

In one implementation, as shown in FIG. 1, stacked access result 116/216 for stacked resource 138 may be determined in action 366 by software code 110, executed by hardware processor 104 of computing platform 102, and using rules engine 111. However, in other implementations, as shown in FIG. 2, action 366 may be performed by software code 210*b*, executed by hardware processor 254 of user system computing platform 252, and using rules engine 211b.

Figure 4:
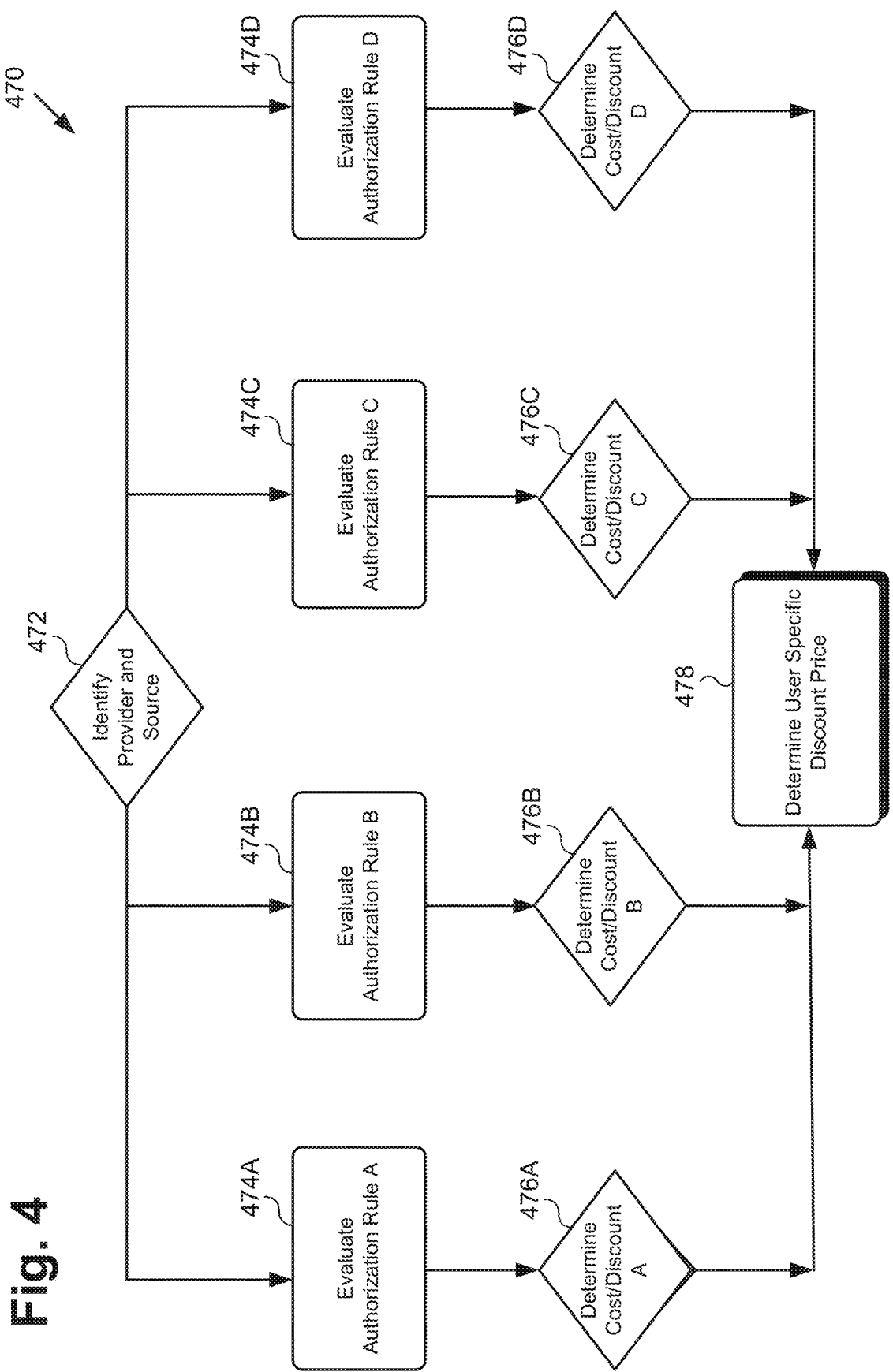
FIG. 4 shows a diagram depicting the dynamic generation of a user specific discounted price for a stacked resource, according to one implementation.

Referring to FIG. 4 in combination with FIGS. 1 and 2, FIG. 4 shows diagram 470 depicting the determination stacked asset result 116/216 in the form of user specific discount price 116/216 for exemplary stacked resource 138 including resources provided by four different resource providers: "A," "B," "C," and "D," according to one implementation. As shown in FIG. 4, diagram 470 begins at node 472 with identifying the provider of each resource included in stacked resource 138, as well as the source from which an entitlement to the resource has been acquired. Diagram 470 continues with evaluating, for each resource provider A, B, C, and D, and the source of the entitlement to the resource provided by each resource provider, authorization rules corresponding to those entities at respective nodes 474A, 474B, 474C, and 474D. It is noted that in use cases in which the one or more entitlements to resources included in asset bundle 138 is/are acquired directly from one or more of resource providers A, B, C, and D, one or more of resource providers A, B, C, and D may be both a resource provider and an entitlement source.

Diagram 470 continues with determining the cost to user 128 of each acquired entitlement, as well as the discount applicable to a predetermined price for stacked resource 138 due to each acquired entitlement at nodes 476A, 476B, 476C, and 476D. At terminal node 478, user specific discount price 116/216 for stacked resource 138 can be determined using the predetermined price for stacked resource 138 and the discount determined at each of nodes 476A, 476B, 476C, and 476D, in a manner analogous to that described above by reference to action 366 of flowchart 360.

Figure 5:
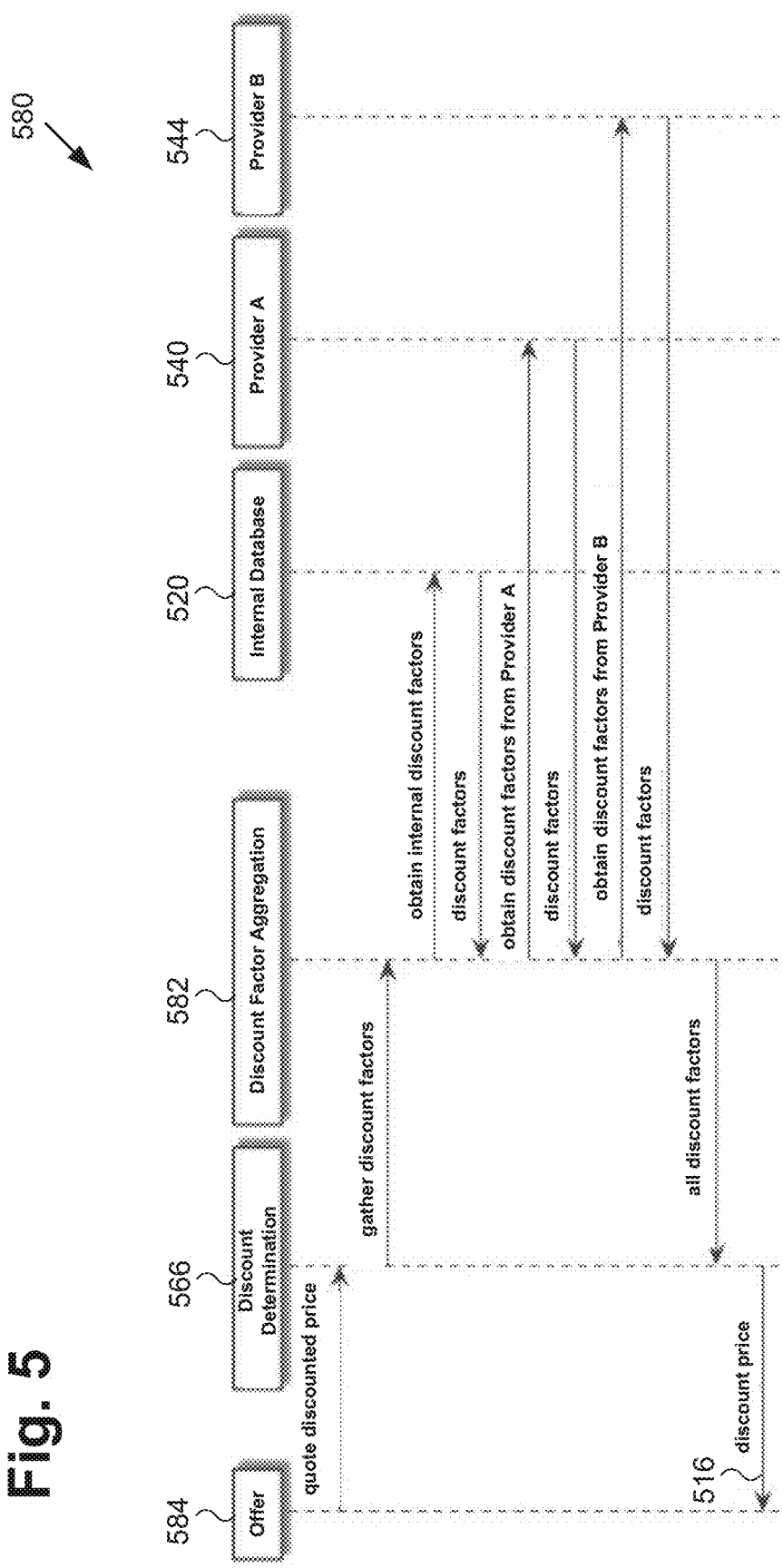
FIG. 5 shows a diagram depicting the aggregation of discounting factors from internal and external sources for use in generating a user specific discounted price for a stacked resource, according to one implementation.

FIG. 5 shows diagram 580 depicting the aggregation of discounting factors from internal and external sources for use in dynamically determining user specific discount price 516 for stacked resource 138, according to one implementation. Diagram 580 corresponds to the exemplary implementation shown in FIG. 1 in which resources included in stacked resource 138 are provided by resource supply 130 of system 100, as well as by external resource provider A 140 and external resource provider B 144. The process depicted by diagram 580 is driven by discount determination 566, which corresponds in general to action 366 of flowchart 360. As shown in FIG. 5, discount determination 566 includes discount factor aggregation 582 in which discounting factors such as the cost to user 128 for acquisition of a resource provided by system 100, the cost to user 128 for acquisition of a resource provided by Provider A 540, and the cost to user 128 for acquisition of a resource provided by Provider B 544, as well as incentives provided to user 128 in exchange for acquiring each resource.

It is noted that user specific discount price 516 and internal database 520 correspond respectively in general to stacked asset result 116/216 and user history database 120/220 in FIGS. 1 and 2. Consequently, user specific discounted price 516 and internal database 520 may share any of the characteristics attributed to respective stacked asset result 116/216 and user history database 120/220 by the present disclosure, and vice versa. In addition, Provider A 540 and Provider B 544, in FIG. 5, correspond respectively in general to resource provider A 140 and resource provider B 144, in FIG. 1. Thus, Provider A 540 and provider B 544 may share any of the characteristics attributed to respective resource provider A 140 and resource provider B 144 by the present disclosure, and vice versa.

According to diagram 580, once discount factors are aggregated from internal database 520, Provider A 540, and Provider B 544, those factors are used to determine user specific discount price 516 for stacked resource 138, as described above by reference to action 366.

Referring to FIGS. 1, 2, 3, and 5 in combination, flowchart 360 may continue and conclude with routing authorization request 124 and stacked access result 116/216/516 to one of the resource provider computers, where that one resource provider computer completes an authorization process for authorizing access to stacked resource 138 based on stacked access result 116/216/516 (action 367). For example, in one implementation action 367 may include offering stacked resource 138 to user 128 at stacked asset result 116/216 in the form of user specific discount price 516 via GUI 112/212a/212b, as shown by offer 584 in FIG. 5.

In one implementation, routing of authorization request 124 and stacked asset result 116/216/516 may be based on one or more of user attributes 132 and 136 received in action 364. For example, in use cases in which user 128 has no previous commercial relationship with system 100, but has obtained a resource provided by resource provider A 140 or resource provider B 144, a better user experience for user 128 may be created by routing authorization request 124 and stacked asset result 116/216/516 to the computer of one of resource provider A 140 or resource provider B 144 with which user 128 does have a relationship. One significant advantage to user 128 of routing authorization request 124 and stacked asset result 116/216/516 to the computer of a resource provider with which user 128 does have a relationship is that it enables user 128 to utilize an existing user account or stored payment information without being required to input additional user or payment information into a second system.

In one implementation, as shown in FIG. 1, action 367 may be performed by software code 110, executed by hardware processor 104 of computing platform 102. However, in other implementations, as shown in FIG. 2, action 367 may be performed by software code 210b, executed by hardware processor 254 of user system computing platform 252. With respect to actions 361-367 of flowchart 360, it is noted that in some implementations, those action may advantageously be performed in an automated process from which human involvement can be omitted.

Thus, the present application discloses systems and methods for performing dynamic authorization rule stacking and routing across multiple systems that address and overcome the deficiencies in the conventional art. As noted above, the authorization rule stacking and routing solution disclosed by the present application can be applied to any set of authorization rules that overlap, such that having already met one condition also means that one or more other conditions have been at least partially met and only need to satisfy the other parts of the outstanding condition to gain authorized access. For instance, according to the exemplary subscription discounting use case discussed in detail above, the main condition may be "user pays at least $12.99 per month for service X, Y, and Z," but we also know from the other providers that the user already satisfied the condition "user pays $47.88 a year for service X", therefore the user only needs to satisfy the condition "user pays at least $9.00 per month to add services Y and Z."

However, more generally, in other use cases the main condition might be "user needs to meet condition X, Y, and Z within time less than n+1" and user attributes obtained from the other providers reveals that the user already satisfied a condition of "user needs to meet condition X within time less than n," therefore now the user only needs to satisfy the condition "meet conditions Y and Z within time less than n+1" because satisfying the other condition partially satisfies the main condition. That is to say, the present concepts have applications beyond purchasing products, and may be applied to use of a computer to authorize access to substantially any resource. For example, the resource could be a secure building or terminal, and the conditions might include various forms of security access, like a set of verification or validation steps that the user has already has completed, at least partially as a result of some other previously performed process. Alternatively, or in addition, the resource may be a secure file or secure network, the user is required to receive a certain number of validations within a certain period of time in order to login, and the user may have recently completed some of the required validation steps at another computer.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory;
a software code stored in the system memory;
the hardware processor configured to execute the software code to:
receive, over a network, an authorization request for a stacked resource on behalf of a user, the stacked resource including a plurality of resources each offered separately by one of a plurality of resource providers, the authorization request comprising an electronic identity of the user;
determine a plurality of resource provider computers associated with the stacked resource;
send a look-up request comprising the electronic identity of the user to the plurality of resource provider computers, wherein the electronic identity is used as a common look-up key by each of the resource provider computers for determining one or more user attributes of the user;
receive from the plurality of resource provider computers, in response to the look-up request, the one or more user attributes;
generate an accumulated access profile of the user based on the one or more user attributes;
apply the accumulated access profile to a rules engine to determine a stacked access result; and
route the authorization request and the stacked access result to one of the plurality of resource provider computers, wherein the one of the resource provider computers completes an authorization process for authorizing access to the stacked resource based on the stacked access result.

2. The system of claim 1, wherein the stacked access result comprises a discount price.

3. The system of claim 1, wherein routing the authorization request comprises routing the authorization request based on the one or more user attributes.

4. The system of claim 1, wherein applying the accumulated access profile to the rules engine comprises traversing a directed acyclic graph, and wherein each node in the directed acyclic graph comprises a preconfigured authorization rule.

5. The system of claim 4, wherein the preconfigured authorization rule defines the stacked access result, a reason, a condition, and a transition rule.

6. The system of claim 5, wherein traversing the directing acyclic graph comprises:
evaluating a first condition defined at a first node to determine a condition evaluation result;
based on the condition evaluation result, using the transition rule to determine the next node, the stacked access result, and the reason; and
evaluating a second condition defined at the next node.

7. The system of claim 6, wherein traversing the directed acyclic graph further comprises:
determining that the transition rule does not determine the next node;
terminating the traversing; and
outputting the stacked access result.

8. The system of claim 1, wherein the plurality of resources included in the stacked resource comprise at least one subscription service.

9. The system of claim 8, wherein the at least one subscription service comprises a content streaming service.

10. The system of claim 1, wherein the electronic identity of the user comprises an email address of the user.

11. A method for use by a system including a hardware processor and a system memory storing a software code including a rules engine, for determining a discount to a bundled asset having a predetermined price, the method comprising:
receiving over a network, by the software code executed by the hardware processor, an authorization request for a stacked resource on behalf of a user, the stacked resource including a plurality of resources each offered separately by one of a plurality of resource providers, the authorization request comprising an electronic identity of the user;
determining, by the software code executed by the hardware processor, a plurality of resource provider computers associated with the stacked resource;
sending, by the software code executed by the hardware processor, a look-up request comprising the electronic identity of the user to the plurality of resource provider computers, wherein the electronic identity is used as a common look-up key by each of the resource provider computers for determining one or more user attributes of the user;
receiving, by the software code executed by the hardware processor, from the plurality of resource provider computers in response to the look-up request, the one or more user attributes;
generating, by the software code executed by the hardware processor, an accumulated access profile of the user based on the one or more user attributes;
applying, by the software code executed by the hardware processor, the accumulated access profile to the rules engine to determine a stacked access result; and
routing, by the software code executed by the hardware processor, the authorization request and the stacked access result to one of the plurality of resource provider computers, wherein the one of the resource provider computers completes an authorization process for authorizing access to the stacked resource based on the stacked access result.

12. The method of claim 11, wherein the stacked access result comprises a discount price.

13. The method of claim 11, wherein routing the authorization request comprises routing the authorization request based on the one or more user attributes.

14. The method of claim 11, wherein applying the accumulated access profile to the rules engine comprises traversing a directed acyclic graph, and wherein each node in the directed acyclic graph comprises a preconfigured authorization rule.

15. The method of claim 14, wherein the preconfigured authorization rule defines the stacked access result, a reason, a condition, and a transition rule.

16. The method of claim 15, wherein traversing the directing acyclic graph comprises:
evaluating a first condition defined at a first node to determine a condition evaluation result;
based on the condition evaluation result, using the transition rule to determine the next node, the stacked access result, and the reason; and
evaluating a second condition defined at the next node.

17. The method of claim 16, wherein traversing the directed acyclic graph further comprises:
determining that the transition rule does not determine the next node;
terminating the traversing; and
outputting the stacked access result.

18. The method of claim 11, wherein the plurality of resources included in the stacked resource comprise at least one subscription service.

19. The method of claim 11, wherein the electronic identity of the user comprises an email address of the user.

20. A system comprising:
a computing platform including a hardware processor and a system memory;
a software code stored in the system memory;
the hardware processor configured to execute the software code to:
receive, over a network, an authorization request for a stacked resource on behalf of a user, the stacked resource including a plurality of resources each offered separately by one of a plurality of resource providers, the authorization request comprising an electronic identity of the user;
obtain, using the electronic identity of the user, one or more user attributes of the user utilized by the plurality of resource providers to identity the user;
generate an accumulated access profile of the user based on the one or more user attributes;
apply the accumulated access profile to a rules engine to determine a stacked access result; and
route the authorization request and the stacked access result to a computer of one of the plurality of resource providers, wherein the computer of the one of the resource providers completes an authorization process for authorizing access to the stacked resource based on the stacked access result.

* * * * *